(12) United States Patent
Chen et al.

(10) Patent No.: US 12,164,118 B2
(45) Date of Patent: Dec. 10, 2024

(54) MULTIFOCAL LENS

(71) Applicant: PIXART IMAGING INC., Hsin-Chu County (TW)

(72) Inventors: Hui-Hsuan Chen, Hsin-Chu County (TW); Yen-Hung Wang, Hsin-Chu County (TW); Wen-Yen Su, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 308 days.

(21) Appl. No.: 17/557,097

(22) Filed: Dec. 21, 2021

(65) Prior Publication Data

US 2022/0365252 A1 Nov. 17, 2022

Related U.S. Application Data

(60) Provisional application No. 63/188,484, filed on May 14, 2021.

(51) Int. Cl.
*G02B 3/10* (2006.01)
*B29D 11/00* (2006.01)
*G02B 3/08* (2006.01)
*G06F 3/03* (2006.01)
*G06F 3/0354* (2013.01)

(52) U.S. Cl.
CPC .......... *G02B 3/10* (2013.01); *B29D 11/00519* (2013.01); *G02B 3/08* (2013.01); *G06F 3/0304* (2013.01); *G06F 3/03543* (2013.01)

(58) Field of Classification Search
CPC ........ B29D 11/00028; B29D 11/00269; B29D 11/00519; G02B 3/08; G02B 3/10; G06F 3/0304; G06F 3/0317; G06F 3/03543
USPC .......................................................... 356/614
See application file for complete search history.

(56) References Cited

U.S. PATENT DOCUMENTS

| | | | |
|---|---|---|---|
| 2003/0043342 A1* | 3/2003 | Seidner | G02C 7/044 351/159.41 |
| 2008/0116359 A1 | 5/2008 | Asper et al. | |
| 2017/0227789 A1* | 8/2017 | Ando | G02C 7/044 |

FOREIGN PATENT DOCUMENTS

| | | |
|---|---|---|
| CN | 1042613 A | 5/1990 |
| CN | 103624913 A | 3/2014 |
| KR | 10-2019-0009643 A | 1/2019 |

* cited by examiner

*Primary Examiner* — Sunghee Y Gray
(74) *Attorney, Agent, or Firm* — HAUPTMAN HAM, LLP

(57) ABSTRACT

There is provided a lens including a first curved surface and a second curved surface. The first curved surface and the second curved surface have different focal distances and are arranged interlacedly along a radial direction of the lens.

8 Claims, 9 Drawing Sheets

MULTIFOCAL LENS

CROSS REFERENCE TO RELATED APPLICATION

The present application claims the priority benefit of U.S. Provisional Application Ser. No. U.S. 63/188,484, filed on May 14, 2021, the disclosure of which is hereby incorporated by reference herein in its entirety.

BACKGROUND

1. Field of the Disclosure

This disclosure generally relates to a lens and, more particularly, to a multifocal lens having an increased operable depth of field (DOF), a mold for manufacturing the multifocal lens and an optical machine structure using the multifocal lens.

2. Description of the Related Art

It is known that a depth of field (DOF) of a lens is determined by an object distance and an F number. When the object distance is shorter, the DOF will be shorter too. In the application operating at short object distances, very short DOF means that the assembling tolerance must be very small, otherwise incident light can converge outside the DOF of a lens due to the assembly deviation. For example, the standard DOF of a current optical mouse device is about 2.4±0.2 mm, and an image captured by an optical sensor thereof is blurred when the assembly deviation is too large such that the operation accuracy is degraded.

Although it is known that the DOF of a lens can be increased by an EDOF lens, the extended DOF is implemented mainly by post-processing using software, but the EDOF does not mean that a lens itself has an ability to increase the DOF.

Accordingly, the present disclosure provides a multifocal lens capable of effectively increasing DOF of a lens, a mold for manufacturing the multifocal lens, and an optical machine structure using the multifocal lens.

SUMMARY

The present disclosure provides a lens having multiple focal distances on which curved surfaces having different focal distances are arranged interlacedly along a radial direction of the lens and focuses of said different focal distances are converged on the same optical axis of the lens.

The present disclosure further provides a mold for manufacturing a multifocal lens. The mold has an inner surface sculptured with mold surfaces having different curvatures interlacedly arranged on the inner surface so as to form the curved surfaces of the multifocal lens having different focal distances.

The present disclosure further provides an optical machine including a multifocal lens. The optical machine has an increased DOF so as to be adapted to an optical tracking device requiring a long working distance.

The present disclosure provides a lens including a light incident surface, a first curved surface and a second curved surface. The first curved surface has a first focal distance. The second curved surface has a second focal distance, wherein the first curved surface and the second curved surface are interlacedly arranged along a radial direction of the lens on the light incident surface.

The present disclosure further provides a mold for manufacturing a multifocal lens. The mold includes an inner surface and a side wall. The inner surface has a first mold surface and a second mold surface respectively configured to shape the first curved surface and the second curved surface of the lens. The side wall is extended out from an edge of the inner surface.

The present disclosure further provides an optical machine structure including a light source, a multifocal lens and an optical sensor. The light source is configured to project light toward a working surface to generate reflected light. The multifocal lens includes a first curved surface having a first focal distance and a second curved surface having a second focal distance, wherein the first curved surface and the second curved surface are interlacedly arranged along a radial direction of the multifocal lens on a light incident surface of the multifocal lens. The optical sensor is configured to receive the reflected light via the multifocal lens.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide a lens having multiple focal distances and having an increased operable DOF to be adapted to an application operating at short object distances, e.g., an optical mouse and optical eradicator, but not limited to. Thus, optical devices adopting the multifocal lens of the present disclosure can have a longer working distance. The present disclosure further provides a mold for manufacturing a multifocal lens.

Figure 1:
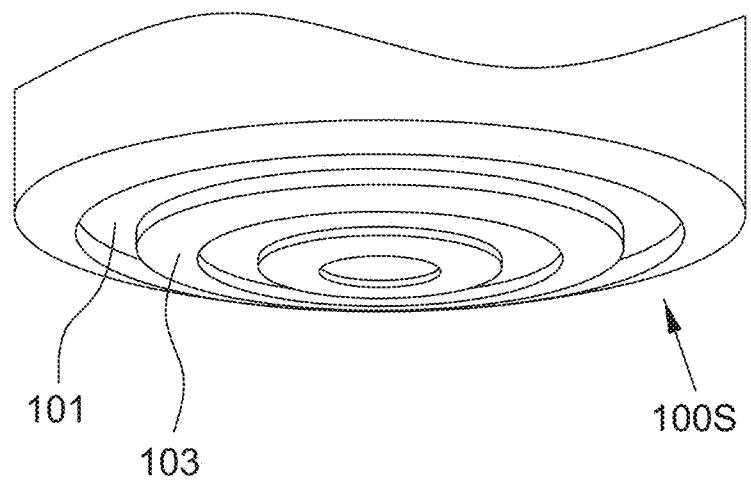
FIG. 1 is a solid diagram of a multifocal lens according to an embodiment of the present disclosure.
Figure 2:
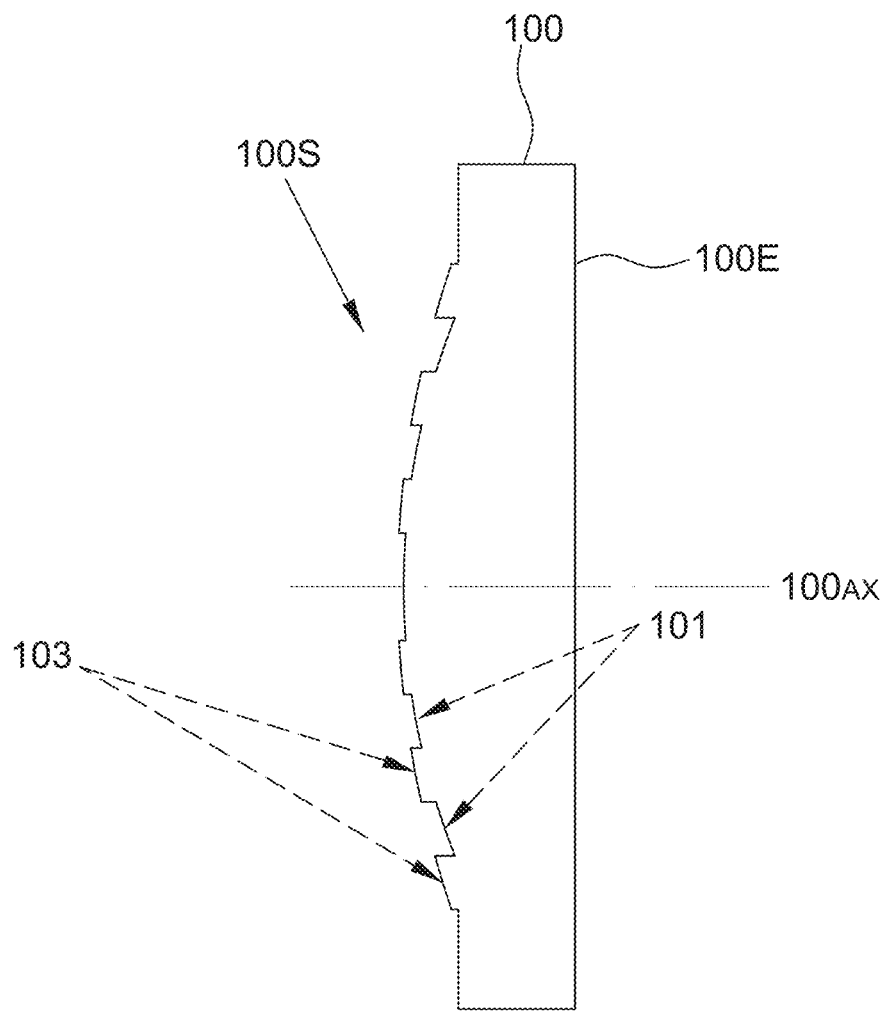
FIG. 2 is a cross sectional view of a multifocal lens according to an embodiment of the present disclosure.

Please refer to FIGS. 1 and 2, FIG. 1 is a solid diagram of a lens 100 according to an embodiment of the present disclosure; and FIG. 2 is a cross sectional view of a lens 100 according to an embodiment of the present disclosure. The lens 100 has a light incident surface 100S, a first curved surface 101 and a second curved surface 103. In one aspect, the first curved surface 101 and the second curved surface 103 are interlacedly arranged along a radial direction of the lens 100 on the light incident surface 100S. The lens 100 further has a light-out surface 100E opposite to the light incident surface 100S. In one aspect, the light-out surface 100E is a plane surface.

In one aspect, the first curved surface 101 is located at a first spherical surface and the second curved surface 103 is located at a second spherical surface, as shown in FIG. 2, and the first spherical surface and the second spherical surface have different radii.

Figure 4:
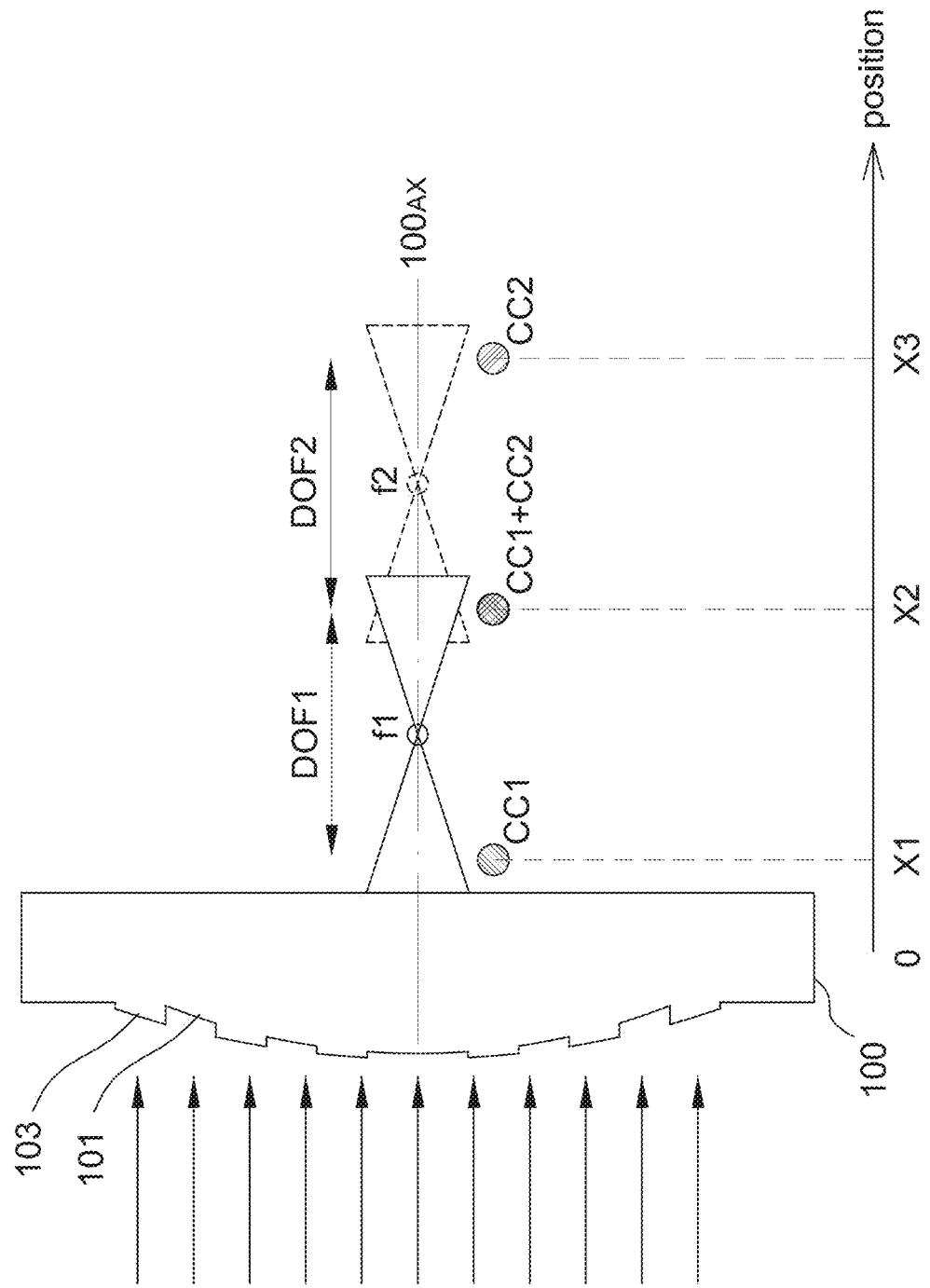
FIG. 4 is an operational schematic diagram of a multifocal lens in conjunction with a monochromatic light source according to an embodiment of the present disclosure.

The first curved surface 101 has a first focal distance (e.g., distance to f1 as shown in FIG. 4) and the second curved surface 103 has a second focal distance (e.g., distance to f2 as shown in FIG. 4). The first focal point f1 and the second focal point f2 are at the same optical axis $100_{AX}$ of the lens 100, and the optical axis $100_{AX}$, for example, goes through a center of the lens 100. In the present disclosure, the first focal distance and the second focal distance are focal distances corresponding to the same light color, e.g., infrared light, blue light or ultraviolet light, but not limited to.

To allow both the near-field light and far-field light to be converged at the focal points f1 and f2, the first curved surface 100 includes at least two first curved rings, e.g., FIGS. 1 and 2 showing two first curved rings and one center curved surface; and the second curved surface 103 includes at least two second curved rings, e.g., FIGS. 1 and 2 showing three second curved rings.

It should be mentioned that although FIGS. 1 and 2 show that a center of the light incident surface 100S is arranged with the first curved surface 101, and the second curved surface (i.e. second curved rings) 103 surrounds the first curved surface 101 (or called center curved surface) located at the center of the light incident surface 100S, the present disclosure is not limited thereto. In another aspect, the center of the light incident surface 100S is arranged with the second curved surface 103, and the first curved surface 101 (i.e. first curved rings) surrounds the second curved surface 103 located at the center of the light incident surface 100S.

In one aspect, the lens 100 of the present disclosure is made of plastic or glass material, and made by injection molding.

Figure 3:
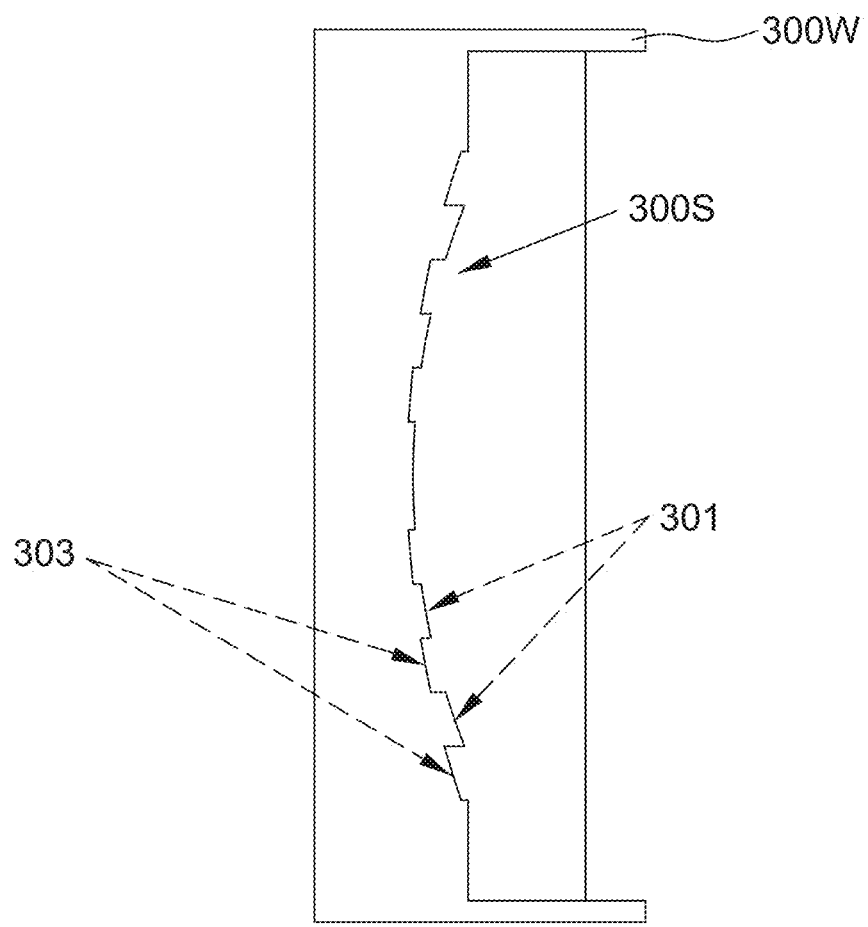
FIG. 3 is a cross sectional view of a mold for manufacturing the multifocal lens of FIGS. 1 and 2 according to an embodiment of the present disclosure.

Please refer to FIG. 3, it is a cross sectional view of a mold 300 for manufacturing the lens 100 of FIGS. 1 and 2. The mold 300 includes an inner surface (or called bottom surface) 300S and a side wall 300W. The side wall 300W extends from an edge of the inner surface 300S, e.g., vertically or with a tilted angle. After the material for forming the lens 100 is injected into the mold 300 and the mold 300 is released, the lens 100 of the present disclosure is formed.

Because the inner surface 300S is used to form the light incident surface 100S of the lens 100, the inner surface 300S includes a first mold surface 301 and a second mold surface 303 respectively for shaping and forming the first curved surface 101 and the second curved surface 103 of the lens 100.

Corresponding to the light incident surface 100S of the lens 100, the first mold surface 301 includes at least two first ring structures having a first curvature, e.g., FIG. 3 showing two first ring structures and one center curved structure; and the second mold surface 303 includes at least two second ring structures having a second curvature, which is different from the first curvature, e.g., FIG. 3 showing three second ring structures.

It should be mentioned that although FIG. 3 shows that a center of the inner surface 300S is arranged with the first mold surface 301, and the second mold surface 303 surrounds the first mold surface 301 located at the center of the inner surface 300S (or called center curved structure), the present disclosure is not limited thereto. In another aspect, the center of the inner surface 300S is arranged with the second mold surface 303, and the first mold surface 301 surrounds the second mold surface 303 located at the center of the inner surface 300S.

Corresponding to the light incident surface 100S of the lens 100, said at least two first ring structures are at a first spherical surface, and said at least two second ring structures are at a second spherical surface, wherein the first spherical surface and the second spherical surface have different radii.

Please refer to FIG. 4, it is an operational schematic diagram of the lens 100 while receiving monochromatic light. In FIG. 4, a first depth of field of the first curved surface 101 is shown as DOF1, and a second depth of field of the second curved surface 103 is shown as DOF2. In one aspect, the DOF1 of the first curved surface 101 is selected between 2 mm and 5 mm, and the DOF2 of the second curved surface 103 is selected between 5 mm and 10 mm. In this way, an optical sensor (e.g., referring to element 63 in FIG. 6B and element 83 in FIG. 8) captures images containing recognizable features at a distance between 2 mm to 10 nm from a center (e.g., shown as position 0 in FIG. 4) of the lens 100, and thus the lens 100 is applicable to an optical tracking device such as an optical mouse and an optical eradicator.

As shown in FIG. 4, the DOF1 of the first curved surface 101 and the DOF2 of the second curved surface 103 are arranged to be partially overlapped in an optical axis direction (e.g., direction of $100_{AX}$). For example, a first curvature of the first curved surface 101 and a second curvature of the second curved surface 103 are arranged in the way that three times of a first circle of least confusion CC1 generated by the first curved surface 101 (e.g., FIG. 4 showing a first circle of least confusion at the focal point f1 as well as three times of the first circle of least confusion at positions X1 and X2) is aligned with three times of a second circle of least confusion CC2 generated by the second curved surface 103 (e.g., FIG. 4 showing a second circle of least confusion at the focal point f2 as well as three times of the second circle of least confusion at positions X2 and X3). It should be mentioned that although FIG. 4 shows that three times of the first circle of least confusion CC1 is overlapped with three times of the second circle of least confusion CC2 at the position X2, the present disclosure is not limited thereto.

In another aspect, three times of the first circle of least confusion CC1 is arranged to be between a range of DOF2, and three times of the second circle of least confusion CC2 is arranged to be between a range of DOF1. Although under this configuration a ghost image appears in the image captured by the optical sensor, said ghost image will not cause an optical tracking device to fail as long as a processor (e.g., 75 shown in FIGS. 7A and 7B) of the optical tracking device is able to acquire feature points in the image captured by the optical sensor of the optical tracking device. The method of performing the tracking according to feature points in the image is known to the art, and thus details thereof are not described herein.

It should be mentioned that although FIG. 4 shows that a focal distance of the first curved surface 101 is shorter than that of the second curved surface 103, the present disclosure is not limited thereto. In another aspect, the focal distance of the first curved surface 101 is arranged to be longer than that of the second curved surface 103 by changing curvatures of the first curved surface 101 and the second curved surface 103.

Figure 6A:
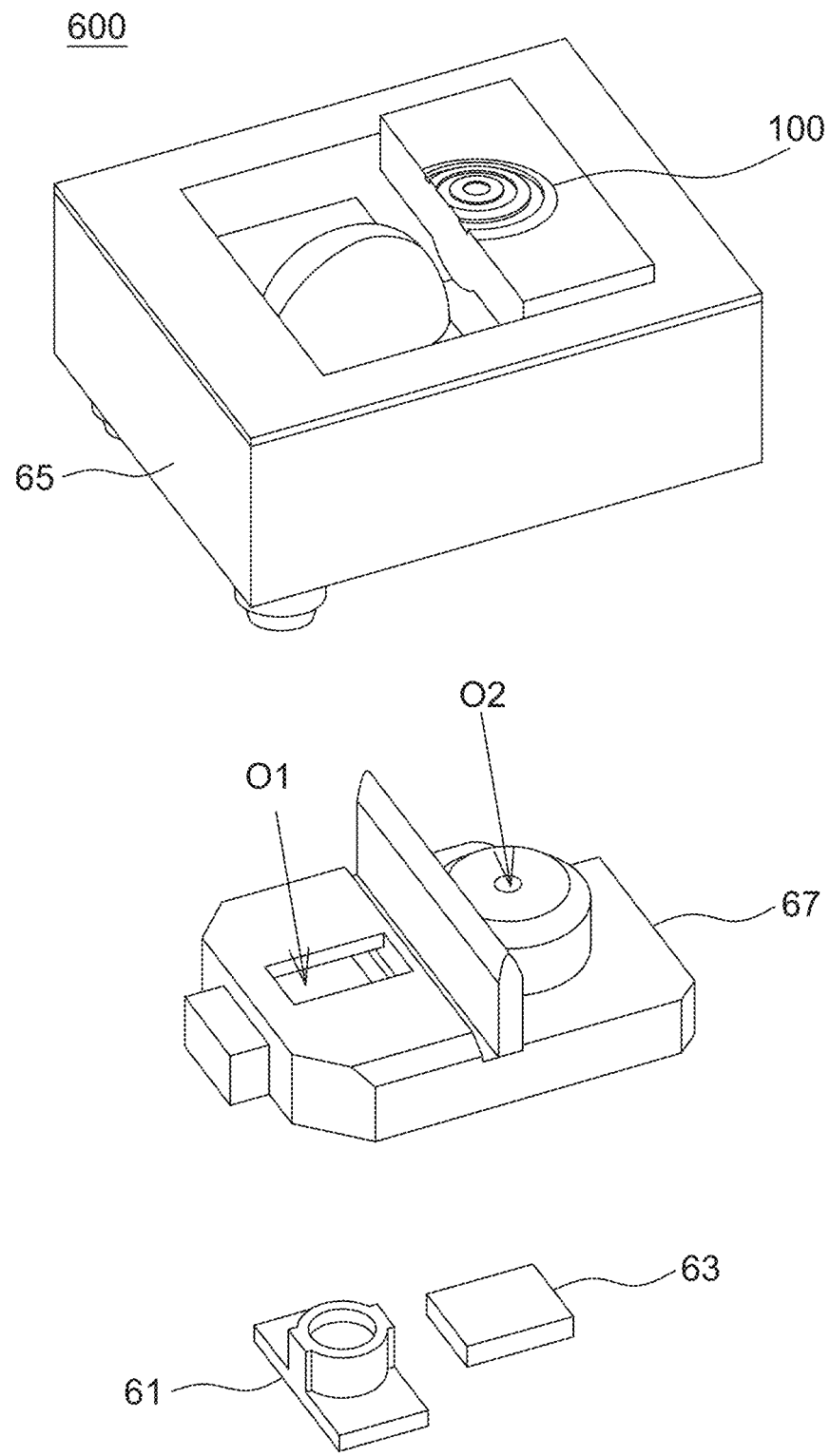
FIG. 6A is an exploded view of an optical machine incorporating the multifocal lens of FIGS. 1 and 2 according to an embodiment of the present disclosure.
Figure 6B:
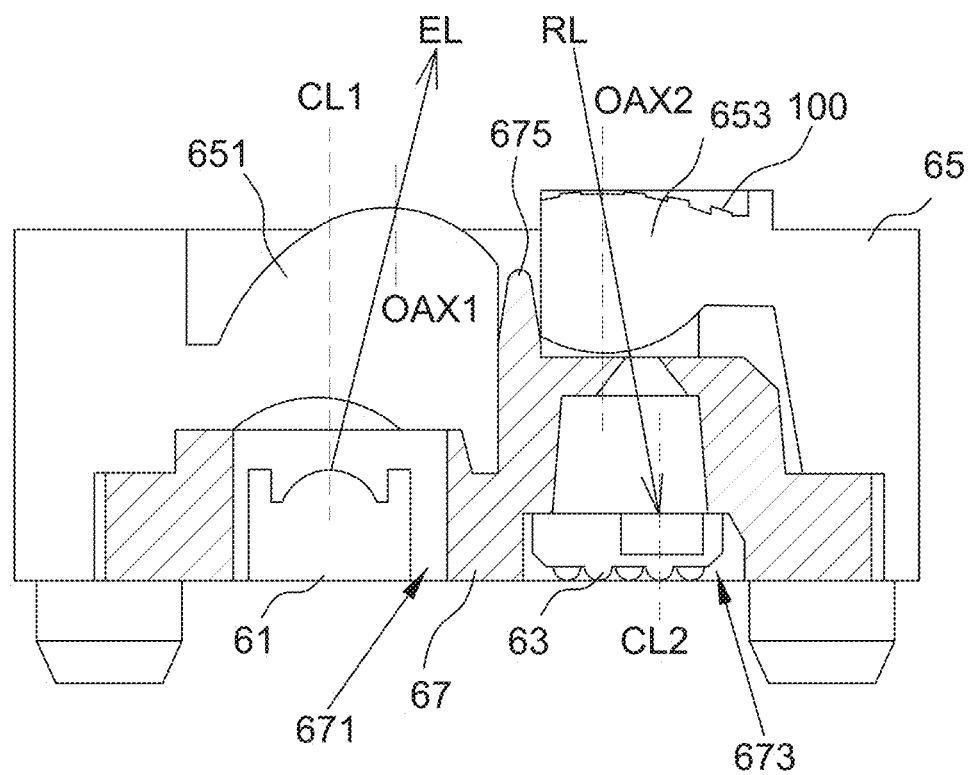
FIG. 6B is a cross sectional view of an optical machine incorporating the multifocal lens of FIGS. 1 and 2 according to an embodiment of the present disclosure.

Please refer to FIGS. 6A and 6B, they are schematic diagrams of an optical machine structure 600 adopting the lens 100 of the present disclosure. FIG. 6A is an exploded view of the optical machine structure 600 and FIG. 6B is a cross sectional view of the optical machine structure 600. The optical machine structure 600 includes a light source 61, an optical sensor (e.g., shown as a chip) 63, a transparent member 65 and a light blocking member 67. The light source 61 and optical sensor 63 are attached and electrically connected to a substrate.

The light source 61 is, for example, a light emitting diode or a laser diode without particular limitations. The light source 61 is used to project light EL toward a working surface (e.g., shown as WS in FIGS. 7A and 7B) to generate reflected light RL.

Figure 5:
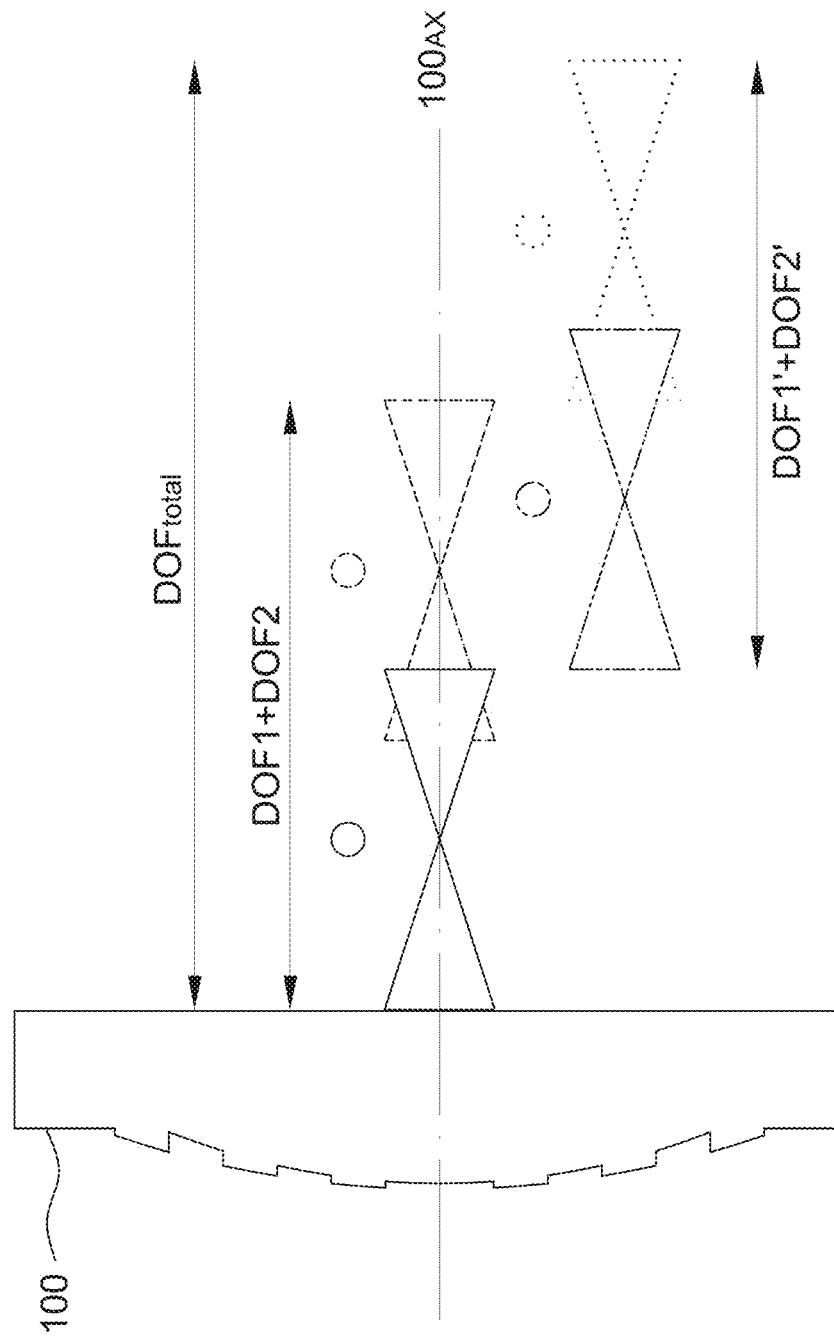
FIG. 5 is an operational schematic diagram of a multifocal lens in conjunction with a bicolored light source according to an embodiment of the present disclosure.

When the light source 61 is a monochromatic light source, a first depth of field DOF1 and a second depth of field DOF2 are formed as shown in FIG. 4. When the light source 61 is a bicolored light source, e.g., implemented by changing driving parameters thereof or arranging two dies for generating different light colors, the first depth of field DOF1 and the second depth of field DOF2 (corresponding to first light color, e.g., ultraviolet light, but not limited to) as well as a third depth of field DOF1' and a fourth depth of field DOF2' (corresponding to second light color, e.g., infrared light, but not limited to) are formed as shown in FIG. 5. In this way, by changing a light wavelength of the light source 61, distances of every depth of field from the lens 100 are changed to further increase an operable depth of field.

It should be mentioned that although FIG. 5 shows that DOF1' and DOF2' are not on the optical axis $100_{AX}$, it is only intended to illustrate but not to limit the present disclosure. In the scenario that incident light parallely goes through the lens 100, DOF1' and DOF2' are shifted from DOF1 and DOF2 in the optical axis direction, e.g., transverse direction in FIG. 5.

In this aspect, DOF1 and DOF1' are depth of fields of the first curved surface 101 corresponding to different light wavelengths, and DOF2 and DOF2' are depth of fields of the second curved surface 103 corresponding to different light wavelengths.

Figure 7A:
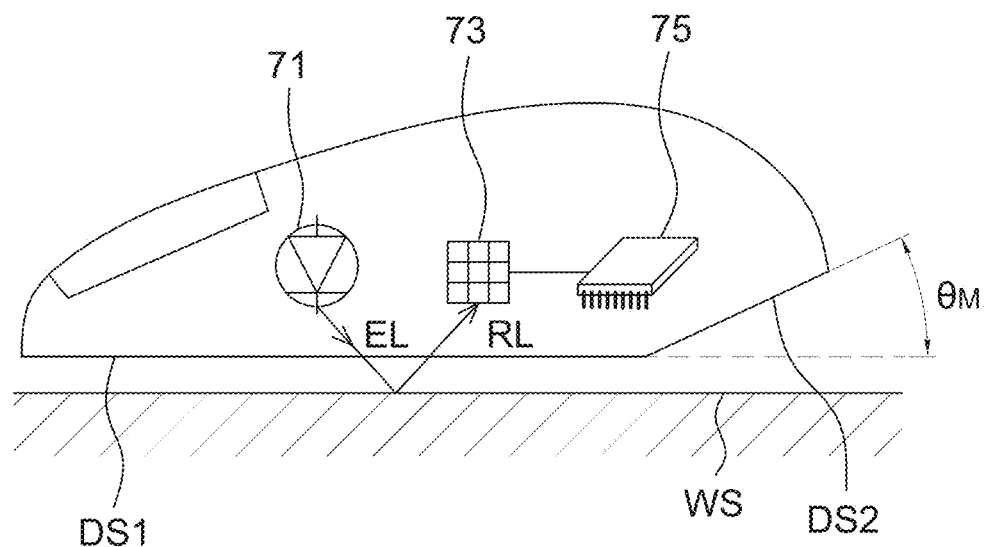
FIGS. 7A to 7B are operational schematic diagrams of an optical mouse incorporating the multifocal lens of the present disclosure.
Figure 7B:
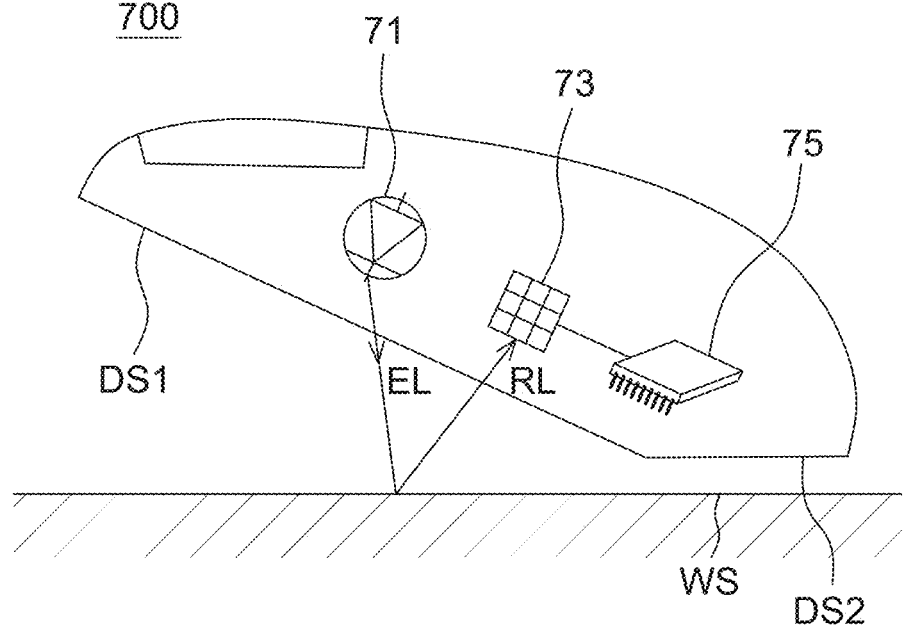

The multifocal lens 100 of the present disclosure is applicable to optical tracking devices requiring different working distances. For example, FIGS. 7A and 7B show that the optical machine structure 600 (e.g., including light source 71 and optical sensor 73) is applied to an optical mouse 700 working in two modes. FIG. 7A shows that when the optical mouse 700 is operated with a first surface DS1, the working surface WS is substantially at a first focal point f1 of the lens 100; whereas, FIG. 7B shows that when the optical mouse 700 is operated with a second surface DS2, the working surface WS is substantially at a second focal point f2 of the lens 100. The reflected light RL from the working surface WS propagates different paths to go through the lens 100 and be received by the optical sensor 73, e.g., identical to the optical sensor 63.

The optical sensor 63 is, for example, a CMOS image sensor or a CCD image sensor without particular limitations. The optical sensor 63 receives the reflected light RL via a multifocal lens (i.e. lens 100).

Please refer to FIG. 6B again, the light blocking member 67 is formed by opaque material (e.g., manufactured by injection molding, but not limited to), and includes a first accommodation space 671, a second accommodation space 673 and a light blocking wall 675. The first accommodation space 671 is used to accommodate the light source 61 and has an opening (e.g., O1 shown in FIG. 6A) to allow light EL to go out of the light blocking member 67. The second accommodation space 673 is used to accommodate the optical sensor 63 and has an opening (e.g., O2 shown in FIG. 6A) to allow reflected light RL to go into the light blocking member 67. The light blocking wall 675 extends from the light blocking member 67 (e.g., vertically or with a tilted angle), and is located between the first accommodation space 671 and the second accommodation space 673 to stop light directly propagating from the light source 61 to the optical sensor 63.

The transparent member 65 is formed by transparent material (e.g., manufactured by injection molding, but not limited to), and includes a first lens structure 651 and a second lens structure 653. The first lens structure 651 is arranged upon the light source 61 and has a first optical axis OAX1. The second lens structure 653 is arranged upon the optical sensor 63 and has a second optical axis OAX2. In one aspect, the light source 61 and the optical sensor 63 are arranged in a first direction (e.g., left-right direction in FIG. 6B). The first optical axis OAX1 is shifted from a first center line CL1 of the light source 61 toward the optical sensor 63 in the first direction, and the second optical axis OAX2 is shifted from a second center line CL2 of the optical sensor 63 toward the light source 61 in the first direction. Using this configuration, a distance between the light source 61 and the optical sensor 63 is shortened to realize a miniaturized optical machine structure 600.

In one aspect, the multifocal lens 100 is aligned with the second lens structure 653, and the multifocal lens 100 and the second lens structure 653 are integrated on the transparent member 65.

Figure 8:
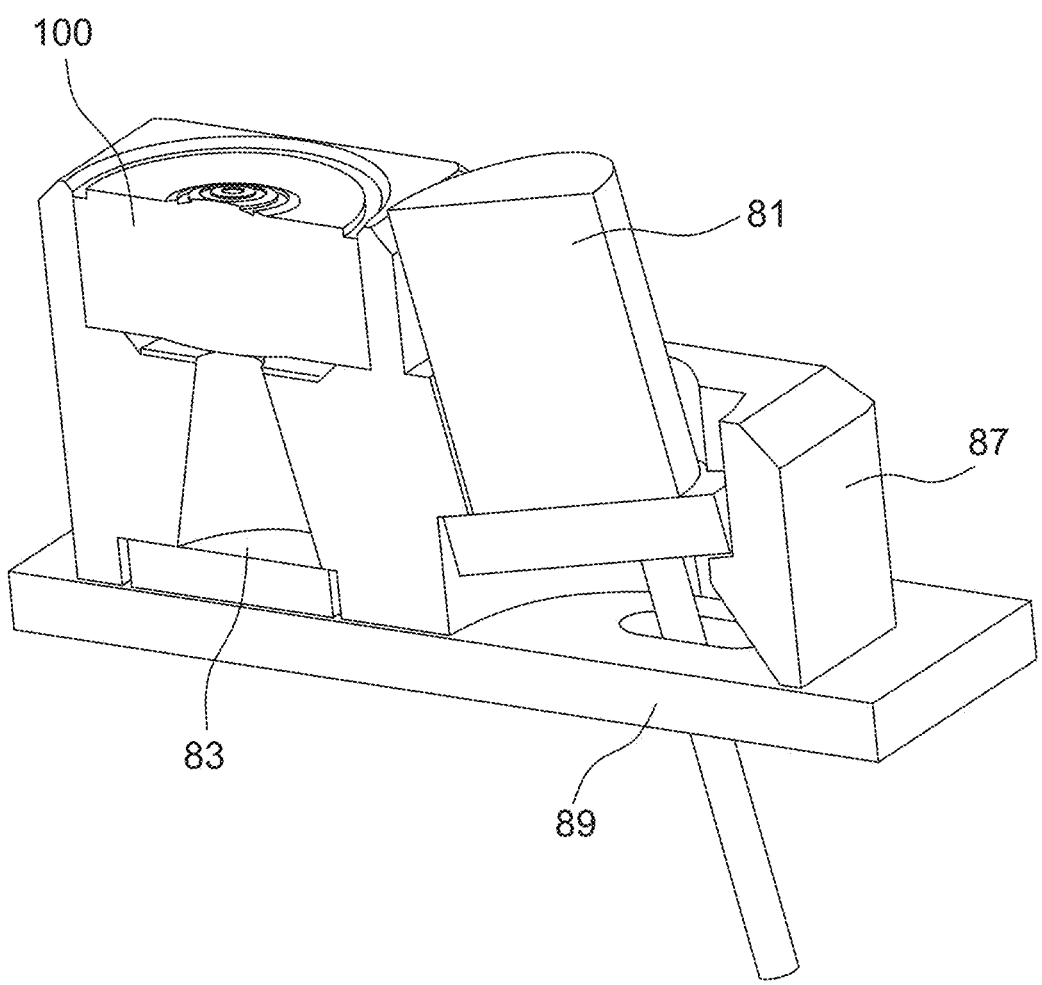
FIG. 8 is another cross sectional view of an optical machine incorporating the multifocal lens of FIGS. 1 and 2 according to an embodiment of the present disclosure.

Please refer to FIG. 8, it is an optical machine structure 800 according to another embodiment of the present disclosure, which is applied to an optical eradicator. The optical machine structure 800 includes a light source 81, an optical sensor 83, a multifocal lens 100, a carriage member 97 and a substrate 89.

The substrate 89 is, for example, a printed circuit board or a flexible board. The carriage member 87 is formed by opaque material (e.g., manufactured by injection molding, but not limited to) and arranged on (e.g., by glue or fixed member) the substrate 89. The carriage member 87 has accommodation spaces to respectively accommodate the light source 81 and the optical sensor 83, which are respectively identical to the light source 61 and the optical sensor 63 in FIG. 6B, and thus details thereof are not repeated herein.

Although FIG. 8 shows that the light source 81 is arranged with a tilted angle, it is only intended to illustrate but not limit the present disclosure. In another aspect, the light source 81 is arranged vertically to the substrate 89.

The carriage member 87 further has a carriage space for accommodating and fixing the lens 100. Because the optical eradicator is operated by a user at different working distances, the tracking performance is improved by using the lens 100 of the present disclosure.

It should be mentioned that the lens 100 of the present disclosure is not limited to be applied to an optical mouse and optical eradicator. Any optical device that requires different working distances during operation improves the working efficiency by adopting the lens 100 of the present disclosure.

It should be mentioned that although the lens 100 in the above embodiments is described in the way having two different curved surfaces, the present disclosure is not limited thereto. The multifocal lens of the present disclosure is possible to be formed by more than two curved surfaces and have more than two focal points.

It should be mentioned that values, including DOFs and a number of curved rings, as well as spatial relationship between elements mentioned in the present disclosure are only intended to illustrate but not to limit the present disclosure.

As mentioned above, the conventional lens has an issue of short DOF while being operated at short working distances to possibly degrade the operation accuracy. Meanwhile, the current EDOF lens does not mean a lens itself has the ability to increase DOF of incident light of the same color. Accordingly, the present disclosure further provides a multifocal lens having increased DOF to light of the same color (e.g., FIGS. 1 and 2), a mold for manufacturing the multifocal lens (e.g., FIG. 3) and an optical machine adopt the multifocal lens (e.g., FIGS. 6A to 8). In the preset disclosure, the DOF of the multifocal lens is further increased while operating in conjunction with a light source emitting different light colors.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A lens, comprising:
   a light incident surface;
   a first curved surface, having a first focal distance; and
   a second curved surface, having a second focal distance, wherein the first curved surface and the second curved surface are interlacedly arranged along a radial direction of the lens on the light incident surface, and a first curvature of the first curved surface and a second curvature of the second curved surface are arranged as three times of a first circle of least confusion generated by the first curved surface being aligned with three times of a second circle of least confusion generated by the second curved surface.

2. The lens as claimed in claim 1, wherein
   the first curved surface comprising at least two first curved rings, and
   the second curved surface comprising at least two second curved rings.

3. The lens as claimed in claim 1, wherein a first focal point of the first focal distance and a second focal point of the second focal point are at a same optical axis of the lens.

4. The lens as claimed in claim 1, wherein
   a first depth of focus (DOF) of the first curved surface is between 2 mm and 5 mm, and
   a second DOF of the second curved surface is between 5 mm and 10 mm.

5. The lens as claimed in claim 1, wherein a first DOF of the first curved surface and a second DOF of the second curved surface are partially overlapped in an optical axis direction of the lens.

6. The lens as claimed in claim 1, wherein the first focal distance and the second focal distance are focal distances corresponding to an identical light color.

7. The lens as claimed in claim 1, wherein
   the lens further comprises a light-out surface corresponding to the light incident surface, and
   the light-out surface is a plane surface.

8. The lens as claimed in claim 1, wherein
   a center of the light incident surface is arranged with the first curved surface, and the second curved surface surrounds the first curved surface located at the center of the light incident surface, or
   the center of the light incident surface is arranged with the second curved surface, and the first curved surface surrounds the second curved surface located at the center of the light incident surface.

* * * * *